United States Patent
Hoshi et al.

[11] Patent Number: 6,144,427
[45] Date of Patent: *Nov. 7, 2000

[54] POLYMER DISPERSED LIQUID CRYSTAL PANEL

[75] Inventors: Hiroaki Hoshi; Shunsuke Inoue, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/568,319

[22] Filed: Dec. 6, 1995

[30] Foreign Application Priority Data

Dec. 8, 1994 [JP] Japan .................................. 6-330499

[51] Int. Cl.⁷ ..................... G02F 1/1333; G02F 1/1335
[52] U.S. Cl. ..................... 349/105; 349/198; 349/86; 349/113; 359/249; 359/578
[58] Field of Search ........................... 349/198, 86, 705, 349/113; 359/249, 578

[56] References Cited

U.S. PATENT DOCUMENTS

| | | | |
|---|---|---|---|
| 5,135,300 | 8/1992 | Toide et al. | 353/31 |
| 5,168,383 | 12/1992 | Iwaki et al. | 359/71 |
| 5,293,272 | 3/1994 | Jannson et al. | 359/3 |
| 5,321,539 | 6/1994 | Hirabayashi et al. | 359/94 |
| 5,381,232 | 1/1995 | Van Mijk | 349/198 |

FOREIGN PATENT DOCUMENTS

| | | |
|---|---|---|
| 0412921 | 2/1991 | European Pat. Off. . |
| 4102954 | 8/1991 | Germany . |
| 178624 | 6/1992 | Japan . |
| 4-249218 | 9/1992 | Japan . |

*Primary Examiner*—William L. Sikes
*Assistant Examiner*—Julie Ngo
*Attorney, Agent, or Firm*—Fitzpatrick, Cella, Harper & Scinto

[57] ABSTRACT

A liquid crystal display device comprises a reflective type liquid crystal panel with pixels which are arranged in two-dimentionally and which modulate irradiated light utilizing polymer dispersed liquid crystal capable of exhibiting two conditions including scattering and unscattering. The device is provided with an optical member having a multiple-interference effect at a predetermined angle with respect to the surface of the reflective type liquid crystal panel.

13 Claims, 7 Drawing Sheets

POLYMER DISPERSED LIQUID CRYSTAL PANEL

BACKGROUND OF THE INVENTION

1. Field of the Invention

The present invention relates to a device for displaying letters and images, and more particularly, relates to various display devices using a polymer dispersed liquid crystal panel.

2. Related Background Art

Liquid crystal display devices of various kinds have been investigated as flat panel display panels up to now. The panel size varies depending on the applied field, for example, a large panel is used for a work station or a personal computer, a panel with a diagonal line of several inches is utilized for a television or a projection television, and a panel with a diagonal line of approximately one inch is used for a view finder or a head mounted display. Corresponding to the decrease in panel size, the pixel size becomes smaller, which provides difficulty in achieving a high-resolution panel. In the case of a liquid crystal display panel of the transmissive type, the aperture ratio of a liquid crystal panel cannot be increased because of the matrix electrode pattern, the orientation defect of liquid crystal, or orientation failure caused by a lateral electric field. For example, the aperture ratio is approximately 30% for a panel which has a diagonal line of one inch and has 100,000 pixels. When a pair of polarizers or a color filter is applied thereto, the transmissivity becomes as small as approximately 3%, which also impedes achievement of a high-resolution panel.

To solve the above mentioned problems, a reflective type liquid crystal panel has been investigated, which is expected to have an aperture ratio of more than twice as large as that of transmissive type liquid crystal panel.

The total transmissivity is, however, still too small under present conditions because of the low transmissivity of the polarizing plate and color filters, even though the aperture ratio is improved by the reflective type liquid crystal panel. Since absorption or diffusion color filter including pigments has low color selectivity, the transmissivity should be usually decreased to around 40% so as to provide enough color cross-talk. Moreover, in the case of a reflective type liquid crystal panel, as the light has to be transmitted through color filters twice, it will lose the portion which is kept from losing by the aperture ratio improvement. Thus, the transmissivity becomes low when a high-resolution panel is requested for a liquid crystal display device. To cover this problem, a large high-intensity light source consuming a huge amount of electric power and a large-scale illuminating optical system comprising a big collective mirror for illuminating the panel and a cold filter are required. In other words, there are such problems as the display device becomes larger and heavier, a huge amount of electric power is required, the light utilization efficiency and production rate become low, and production cost is higher.

SUMMARY OF THE INVENTION

The object of the present invention is to provide an liquid crystal display device which is able to overcome above mentioned problems.

Following are the structural features of the present invention performed to achieve the above object.

According to the present invention, a liquid crystal display device comprises a liquid crystal panel having pixels which are arranged two-dimentionally and which modulate irradiated light. The device is provided with an optical member having a multiple-interference effect at a predetermined angle including 0° with respect to a surface of the liquid crystal panel.

The present invention further comprises the following features:

liquid crystal in the liquid crystal panel can exhibit at least two conditions including scattering and unscattering;

the liquid crystal being capable of exhibiting two conditions including scattering and unscattering is polymer dispersed liquid crystal;

the optical member has a Fabry-Perot interference effect;

the optical member is a Fabry-Perot etalon;

the optical member is integrated with the liquid crystal panel;

the optical member is allowed to transmit only light whose wavelength is included in a band for three primary colors R, G, and B for color display;

the optical member is composed of segmental portions corresponding to the pixel arrangement of the liquid crystal panel, which portions are allowed to transmit only light whose wavelength is included in a band for one of three primary colors R, G, and B which are displayed by the corresponding pixel;

the segmental portions of the optical member are arranged in a stripe or mosaic pattern;

the liquid crystal panel is a transmissive type and the optical member is arranged substantially parallel to the panel face;

a plurality of transmissive type panels, a plurality of illuminating systems corresponding to the transmissive type panels, and a plurality of projective optical systems corresponding to the transmissive type panels are provided, and the optical member is arranged between each transmissive type panel and a corresponding projective optical system;

the liquid crystal panel is a reflective type and the optical member is positioned inclined at a predetermined angle with respect to the panel face; and an illuminating system, a plurality of reflective type panels, and a projective optical system are provided, the optical member is arranged at reflective side of each reflective type panel, and the reflective type panels are positioned and arranged to form successive stages, such that the reflected light beams from the optical member are irradiated in a direction perpendicular to the reflective type panel of the next stage.

According to the present invention above, in such a case that the liquid crystal is capable of exhibiting such conditions including scattering and unscattering, guiding for unscattered light or shading for scattered light is performed quite efficiently, after the illumination light is scattered or unscattered by the liquid crystal controlled by each pixel. In other word, as the above optical member with a multiple-interference effect has spectroscopic band pass characteristic of an interference filter and the characteristic depends on incident angle, it is allowed to selectively transmit only those light beams in a desirable wavelength range with a minute loss according to the liquid crystal condition, such as scattering or unscattering, which is obtained by controlling each pixel. Therefore, it is achieved to display a bright image with a high contrast.

DETAILED DESCRIPTION OF THE PREFERRED EMBODIMENTS

The present invention will be understood from the following detailed description taken in consideration with the accompanying drawings.

Embodiment 1

This embodiment concerns a display device according to the present invention using a reflective type display panel. Structural features of the reflective type display panel incorporated in this embodiment will be described using FIG. 1 and 2.

Figure 1:
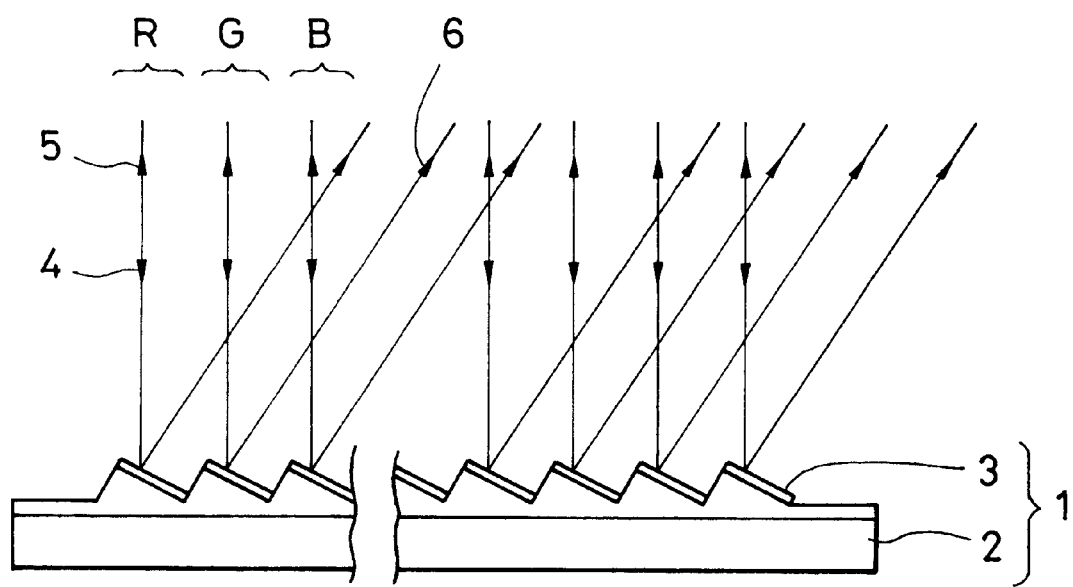
FIG. 1 is a sectional view showing a reflective type display panel incorporated in embodiment 1.
Figure 2:
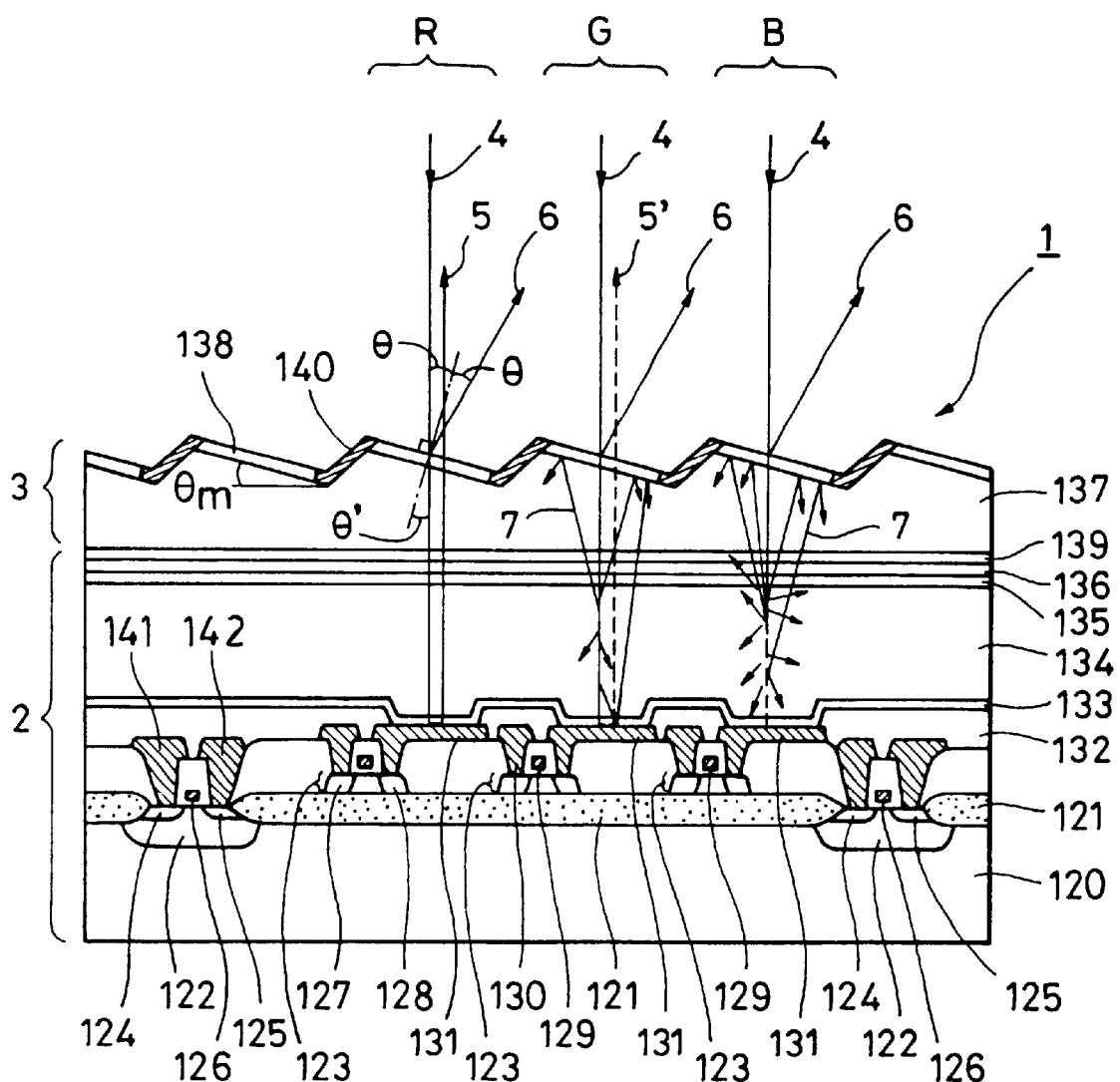
FIG. 2 is a partial enlarged sectional view of the reflective type display panel in FIG. 1.

Referring now to the Figures, a sectional view of a display panel is shown in FIG. 1 and a typical enlarged view of the panel is illustrated in FIG. 2. A reflective type display panel 1 comprises a reflective type PDLC (Polymer Dispersed Liquid Crystal) panel 2 and optical members 3 having a multiple-interference effect provided at a predetermined angle with respect to the surface of the PDLC panel 2, as is shown in the Figures. There is also shown illumination light 4, image display light 5 returning from the PDLC panel 2, and reflected light 6 reflected by the optical members 3. The primary three colors, red, green, and blue, for color display are indicated as R, G and B, respectively.

Referring now to FIG. 2, there is shown an Si substrate 120, field oxide films 121, well layers 142, 142 of bulk Si transistor for driving liquid crystal display element 122, poly Si layers 123 forming pixel area TFT, sources 124, drains 125, and gates 126 of the bulk Si transistors for drive, sources 127, drains 128, and gates 129 of the pixel area TFT, signal lines layers 130 connecting to the sources of the pixel area TFT, pixel area reflectors 131, passivation films 132, orientation films 133, 135, a PDLC layer 134, a transparent electrode 136, a plastic substrate 137, multiple-interference layers 138, an antireflection film 139, and absorption type shading layers 140.

To display colors, each pixel corresponds to one of the colors of R, G, and B, and a multiple-interference layer 138 corresponding to R, G, or B is arranged for a corresponding pixel. As a two-dimensional arrangement for R, G, and B, there are a delta arrangement and a stripe arrangement, either of which may be applied to this embodiment.

When the PDLC is used as a liquid crystal, a pair of polarizers is not required, resulting in improved light utilization efficiency. Since a liquid crystal molecular is anchored in a polymer resin droplet, the random orientation of the liquid crystal molecular can be controlled by applied voltage. Therefore, PDLC changes its light scattering power according to the applied voltage.

Image display operation for the PDLC panel 1 will be described employing FIG. 2. The PDLC layer 134 changes its light scattering condition according to the voltage applied between the transparent electrode 136 and the reflectors in the pixel area 131. When a high voltage is applied, the liquid crystal which has an anisotropic refractive index and which is anchored in a droplet is oriented by the voltage, and the incident light is transmitted through without being scattered. In the case of a low voltage, the liquid crystal is not oriented in one direction and has a random arrangement of the direction with the anisotropic refractive index. Thus, the incident light is scattered intensely. That is, when the unscattering condition and scattering condition are regarded as bright and dark, respectively, it is possible to display an image by controlling the voltage applied to each of the pixels, utilizing the pixels arranged in a two-dimensional matrix and an electrode pattern of them.

Since a reflective type liquid crystal panel is employed, the incident light goes back and forth in the PDLC layer 134 and is scattered intensely, providing approximately twice as much contrast compared with a transmissive type liquid crystal panel with the same depth.

According to the present invention, a high-resolution panel having hundreds and thousands to millions of pixels is achieved by reducing steps using thin polysilicon TFT with a depth of 200 to 500 μm for the pixel area and by employing bulk single crystal Si for the peripheral circuit so as to provide a high-speed operation.

A multiple-interference effect will be described taken in conjunction with FIG. 2, which effect is caused by the optical members 3 including the plastic substrate 137, the multiple-interference layers 138, and the absorption type shading layers 140. The light 4 obliquely enters into the multiple-interference layers 138 composed of parallel plates (disposed at angle $\theta_m$). The repeated reflection interference of the light 4 is known as an interference of equal inclination.

Further, it is also known that the observed interference fringe is clear and narrow because of the multiple-interference.

Intensity transmissivity T and intensity reflectivity R are represented by the following formula:

$$T = 1/\{1 + f \sin^2(\sigma/2)\} \quad \text{Formula (1)}$$

$$R = f \sin^2(\sigma/2)/\{1 + f \sin^2(\sigma/2)\} \quad \text{Formula (2)}$$

wherein d represents depth, r represents the reflection coefficient of the surface and the opposite surface of a parallel plate whose refractive index is n. f is represented by the following formula.

$$f = 4r^2/(1-r^2)^2 \quad \text{Formula (3)}$$

$$\sigma = 4\pi n d \cos\theta'/\lambda \quad \text{Formula (4)}$$

wherein σ is a phase difference, θ' is a refraction angle and λ is a wavelength.

A sharp interference fringe appears at the position which fulfills the formula below, under the condition of T=1 and R=0:

$$\sigma = 2\pi N \text{ (N is an integer)} \quad \text{Formula (5)}$$

The parameters affecting the σ value are the refractive index n, depth d, incident angle θ (connected to the refraction angle θ' by Snell's law: n sin θ = sin θ'), and a wavelength λ.

Figure 3A:
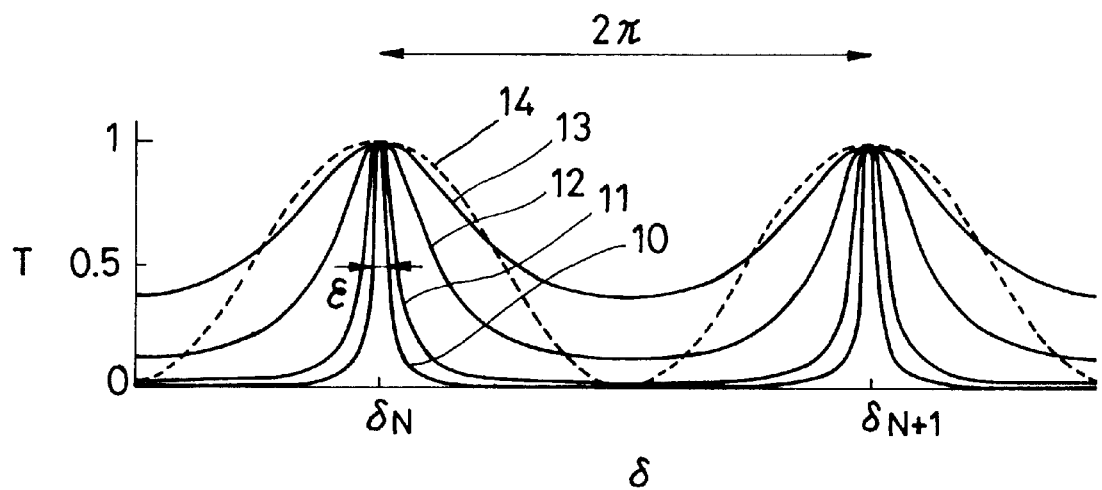
FIGS. 3(a) and 3(b) illustrate a multiple-interference effect described in embodiment 1.
Figure 3B:
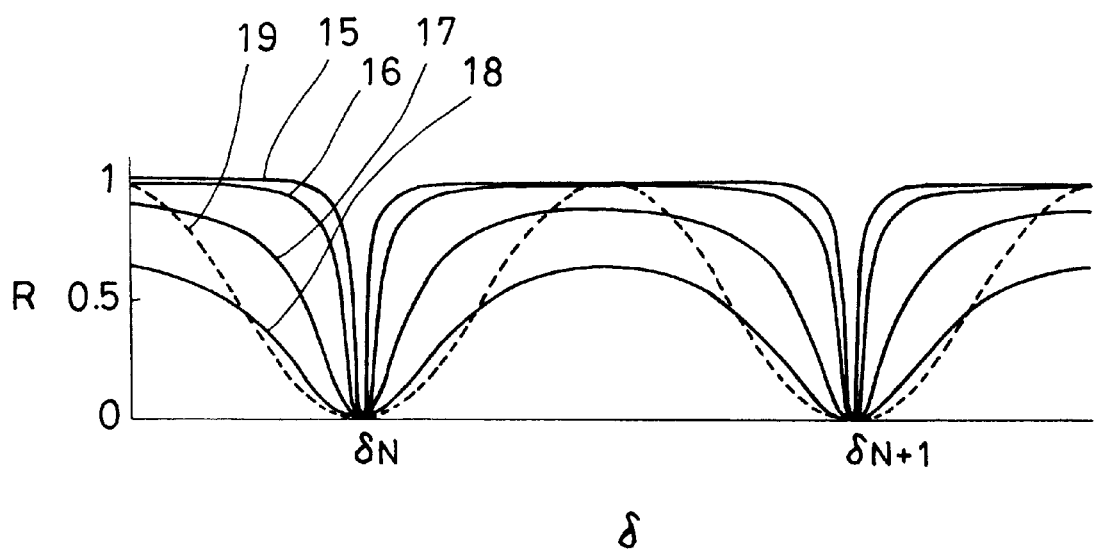

FIG. 3 illustrates the above mentioned relations, showing the change of intensity transmissivity T (FIG. 3a) and intensity reflectivity R (FIG. 3b) according to the phase difference σ, and also indicating the interference fringe patterns of order N and N+1. It will be seen from the Figures, that the peaks of the intensity of interference fringe at the position of $\sigma=\sigma_N$, $\sigma_{N+1}$ corresponds to the spectroscopic band (generally it means the band of λ, however, it is also applied to n, d and θ as is mentioned above). In other words, although FIG. 3 plots σ as the abscissas, it may plot one of the parameters n, d, θ and λ instead of σ, utilizing formula (4).

Finese (F) is used as an evaluating parameter for the interference fringe. When expressed by the phase difference, the interval between the maximum intensity values of the interference fringe is 2π, as is shown in FIG. 3. And F is defined as the ratio of the interval to full width at half maximum of the interference fringe ε (corresponding or in proportion to the spectroscopic band width) as follows:

$$F=2\pi/\epsilon \qquad \text{Formula (6)}$$

when $\sigma=2\pi N\pm\epsilon/2$, T=½ is obtained from formula (1).

Thus, if full width ε is ε→0, the following formula is led:

$$\epsilon=4/\sqrt{\vphantom{f}}\sqrt{f} \qquad \text{Formula (7)}$$

Consequently, from formula (3) and (6), F is represented as follows:

$$F=\pi\sqrt{\vphantom{f}}\sqrt{f}/2=\pi r/(1-r^2) \qquad \text{Formula (8)}$$

According to the increase of finese F, the full width at half maximum ε becomes narrower, resulting in sharp and visible interference fringe. From formula (8), it is understood that the reflection coefficient r should be increased to obtain a larger F value. This relation is also shown in FIG. 3. Characteristic curves 10, 11, 12, 13, and 14 for intensity transmissivity T and characteristic curves 15, 16, 17, and 18 for intensity reflectivity R correspond to $r^2$=0.9, 0.8, 0.5, 0.25, respectively. The finese values corresponding to those $r^2$ values are F=29.8, 14.0, 4.4, 2.1, respectively. For reference, the characteristic curves 14 and 19 which are indicated by dotted lines in FIG. 3 show two-beam interferences (sine waves) in the case of F=2.0.

As above mentioned, if finese F is enough large, the spectroscopic band width becomes narrower, providing a sharp selectivity of angle. That is, when incident angle of light is various and its wavelength is λ, referring to formula (4), only the light whose incident angle fulfills the requirement of formula (5) is allowed to pass through and other light is reflected.

By changing those parameters mentioned above except the wavelength λ, it is possible to provide this spectroscopic band for each of the multiple-interference layers 138 corresponding to R, G, or B. According to this embodiment, the band is set up for each pixel corresponding to R, G, or B by changing the parameter d, the depth of the multiple-interference layers 138. In addition, it is apparent from FIG. 3a that the light should be reflected in the same direction as the incident angle θ to obtain the highest light utilization efficiency. Therefore the angle which a multiple-interference layer 138 forms with respect to the surface of a pixel area reflector 131 is set up to θ.

When a reflective type display panel 1 with a structure shown in FIG. 2 is used, among the illumination light 4, only that having the wavelength λ and the incident angle θ is allowed to pass through the multiple-interference layers 138 and to impinge upon the PDLC layer 134, which wavelength λ and incident angle θ are selected by any of the spectroscopic bands of the multiple-interference layers 138 corresponding to R, G, or B. The rest of the light is reflected by the multiple-interference layers 138 in the direction at reflection angle θ, in other words, the angle which the reflected light forms with respect to the incident light is 2θ. As it will be seen by shifting the reflection characteristic curves shown in FIG. 3b to the position corresponding to each wavelength of R, G, or B, the bands of the reflected light 6 are different from one another, according to the multiple-interference layers 138 for R, G, and B.

When the liquid crystal of the PDLC layer 134 is oriented in one direction by the pixel voltage, the incident light with a wavelength λ pass through the PDLC layer 134 at first, and is reflected by the pixel area reflectors 131. After that, the reflected light is transmitted through the PDLC layer 134 again, retransmitted through the multiple-interference layers 138, and returns as the light 5 in the same direction of the incident light. In FIG. 2, the pixel corresponding to R shows an example of the above process.

In the case that the liquid crystal is not oriented because of a low pixel voltage, incident light with a wavelength λ changed to the light 7 after being reflected in the PDLC layer 134 by the scattering caused by PDLC, etc. and the reflection by the pixel area reflectors 131 and the like, and then, the light reenters the multi-interference layers 138 at various incident angles. As a result, only light with a incident angle of θ is allowed to be transmitted through the multiple-interference layers because the angle selectivity of their spectroscopic band is so sharp as mentioned above, and the rest of the light is reflected. Thus, the light with a wavelength of λ can hardly return. In FIG. 2, the pixel corresponding to B shows an example of the above process.

In addition, gradation display is achieved, since an intermediate condition (in FIG. 2, the pixel corresponding to G shows an example of it) between the above two is obtained by controlling the scattering power of the PDLC layer 134 using the pixel voltage.

The absorption type shading layers 140 are prepared for decreasing the optical cross-talk with adjacent pixels. Therefore, the intensity of light 5 having a wavelength of λ and returning in the incident direction of the illumination light is modulated in a good contrast by those layer.

As we have seen, after the light is transmitted through the optical members 3 having multiple-interference effect, the intensity of the light is modulated by the pixel voltage. Thus two dimensional image displayed with desirable gradation is achieved by controlling the voltage for each of the pixels arranged in a two dimensional matrix.

According to this embodiment, a high-quality picture is obtained when observed from the incident direction of the illumination light 4. In addition, it is possible to separate the light beams of display light returned from the display from the illumination light using an optical means such as a half mirror. Furthermore, an appropriate selection of the spectroscopic band for the multiple-interference layers 138 allows the display light to be reflected by the display at a small angle with the direction of the incident light. As a result, the illumination light is separated from the display light without using a half mirror, etc., preventing the light utilization efficiency from decreasing caused by such as a half mirror. The arrangement may be such that illumination light impinges upon at an angle which slightly deviates (Δθ) from incident angle θ which provides the central peak of the spectroscopic band, and a viewer observes from the direction which deviates (−Δθ) from incident angle θ. The advantage of the present invention is not impaired largely under such a condition.

As mentioned above, a display device is achieved which can display bright images with a high contrast, selectively transmit light beams having a desirable range of wavelength and desirable directions with only a minute loss. The device is also capable of effectively shading the scattered light and guiding the unscattered light, utilizing not only the characteristics of the narrow-band transmission and its dependence on the incident angle caused by a multiple-interference effect but also the orientation of liquid crystal having anisotropic refractive index by controlling each pixel using a two-dimensional matrix arrangement and an electrode pattern of the pixels.

Embodiment 2

Figure 4:
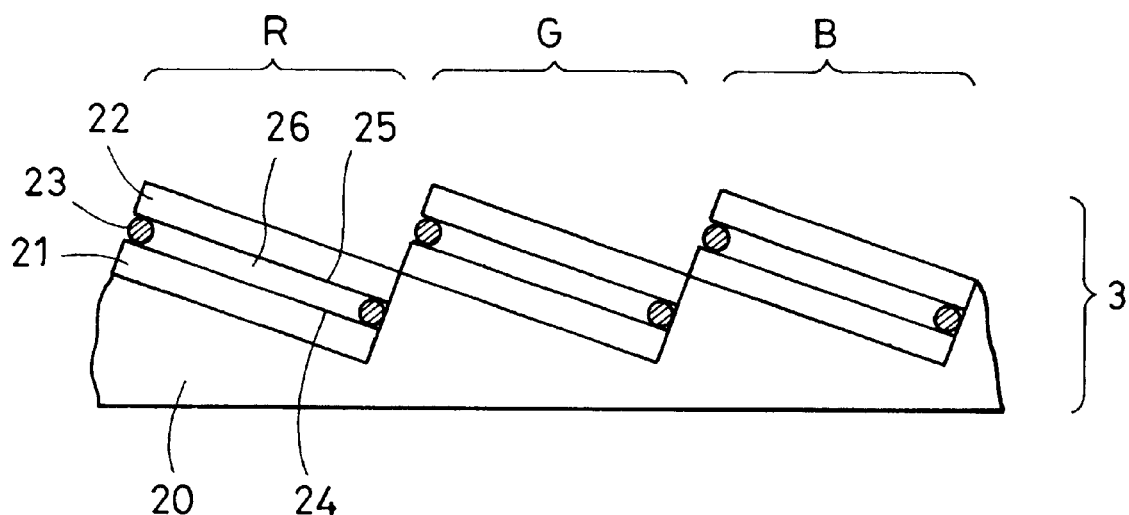
FIG. 4 is a sectional view showing optical members of a reflective type display panel incorporated in embodiment 2.

This embodiment concerns a display device according to the present invention using a Fabry-Perot interferometer as an optical member having a multiple-interference effect. FIG. 4 illustrates an enlarged sectional view of a portion corresponding to the optical members 3 in the reflective type display panel 1 shown in FIG. 2 incorporated in embodiment 1. Since structural features of a reflective type PDLC 2 are similar to those of embodiment 1, its drawing is omitted.

Referring now to FIG. 4, there is shown a plastic substrate 20, parallel plate mirrors 21, 22, shading portions provided by spacers 23, mirror faces 24, 25 each of which are formed by high-reflection film prepared on the mirrors 21, 22, respectively, and resin 26 with a refractive index of n is packed between a pair of mirrors 21 and 22.

A Fabry-Perot interferometer comprises a pair of high-reflectivity mirrors 21, 22 opposed in parallel with each other at a distance of d so as to utilize the multiple-interference of the optical path occurred in between. If there is a phase change caused by the reflection at the mirror faces 24 and 25, it is regarded as $\phi$. As the formula shown in embodiment 1 will be used in the same manner by adding $2\phi$ to the right side of formula (4), an explanation for those formula is omitted.

Practically, such materials as a glass substrate, plastic substrate, and dielectric thin film are used for the high-reflectivity mirrors 21 and 22, and high-reflectivity films are formed thereon to make the mirror faces 24 and 25. As the high-reflectivity films, metallic films or dielectric multi-layer films are applied by methods such as vapor deposition. Although preparing a metal film of a monolayer from aluminium, silver, gold, chromium, etc. is easy, it should be taken into consideration that there is a phase change $\phi$ by reflection as described above and an increase in the reflectivity is limited by absorption and the like. On the other hand, when dielectric multi-layer films are used, it is possible to avoid the phase change and to increase the reflectivity, although much labor is required to alternately laminate a high-refractive index film made of such materials as ZnS with a thickness of $\lambda/4$ and a low-refractive index film made of such materials as $MgF_2$ with a thickness of $\lambda/4$.

By means of the optical members 3 having a Fabry-Perot interference effect illustrated in this embodiment, it is possible to increase the degree of freedom for the reflection coefficient r which is mentioned above, to set up the characteristic of the spectroscopic band and the incident angle easier to desirable values, and to make the optical members 3 thinner. Therefore, a small light-weight display device is achieved with bright images and a high contrast.

Embodiment 3

Figure 5:
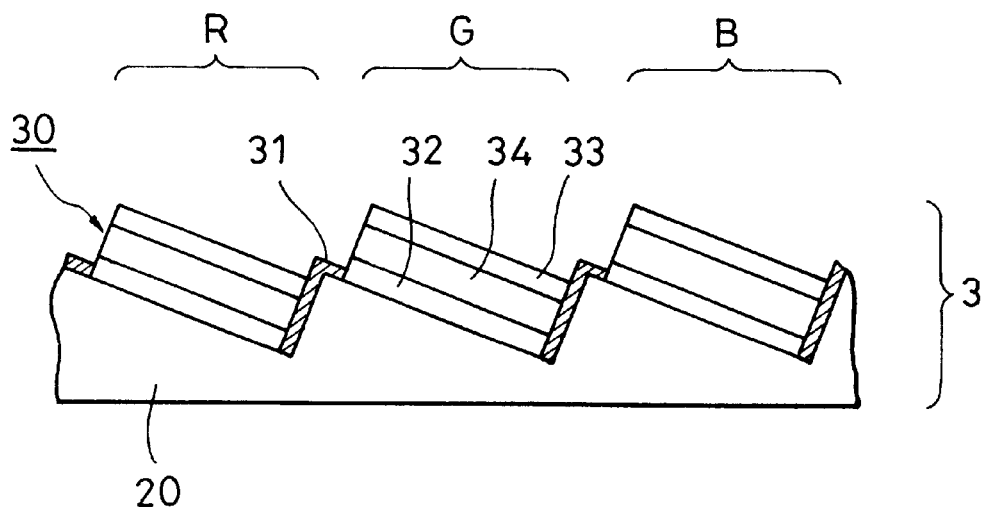
FIG. 5 is a sectional view showing optical members of a reflective type display panel incorporated in embodiment 3.

This embodiment concerns a display device according to the present invention using a Fabry-Perot etalon as an optical member having a multiple-interference effect. FIG. 5 illustrates an enlarged sectional view of a portion corresponding to the optical members 3 in the reflective type display panel 1 shown in FIG. 2 incorporated in embodiment 1. Since structural features of a reflective type PDLC 2 are similar to those of embodiment 1, its drawing is omitted.

Referring now to FIG. 5, there is shown a plastic substrate 20, etalon 30, absorption type shading areas 31, light reflection films 32, 33 and dielectric films 34.

A Fabry-Perot etalon 30 comprises a pair of high-reflectivity light reflection films 32, 33 provided on both sides of dielectric substrates, with a refractive index of n and a depth of d, or the dielectric films 34. Since each member of the etalon 30 is comprised in one body, it has stable qualities, allows easy fabrication and adjustment, and is endurable to change with time. The light reflection films 32, 33 can be prepared by the same manner as the mirror faces 24, 25 made of high-reflectivity films shown in FIG. 4 of the embodiment 2.

According to this embodiment, there is a possibility that the reflectivity of the light reflection films 32, 33 are not the same, since the plastic substrate 20 and air, whose refractive indexes are different from each other, asymmetrically have the etalon 30 in between (which fact may similarly happen in above embodiment 2). It is noteworthy, however, in the case of employing the etalon, that the reflectivity of those faces can be independently set up to optimum values using dielectric multi-layer films. Thus, the above problems are solved. A well-known interference filter may be regarded as the etalon, resulting in a 1 to 50 nm of half band width and a 30 to 90% of transmissivity.

The optical members 3 themselves are allowed to be integrated and to be thinner by using an optical member having a Fabry-Perot etalon type interference effect. Therefore, a small light-weight display device is achieved with bright images and high contrast.

Embodiment 4

This embodiment concerns a display device according to the present invention using a transmissive type display panel. Structural features of the transmissive type display panel incorporated in this embodiment will be described utilizing FIG. 6.

Figure 6:
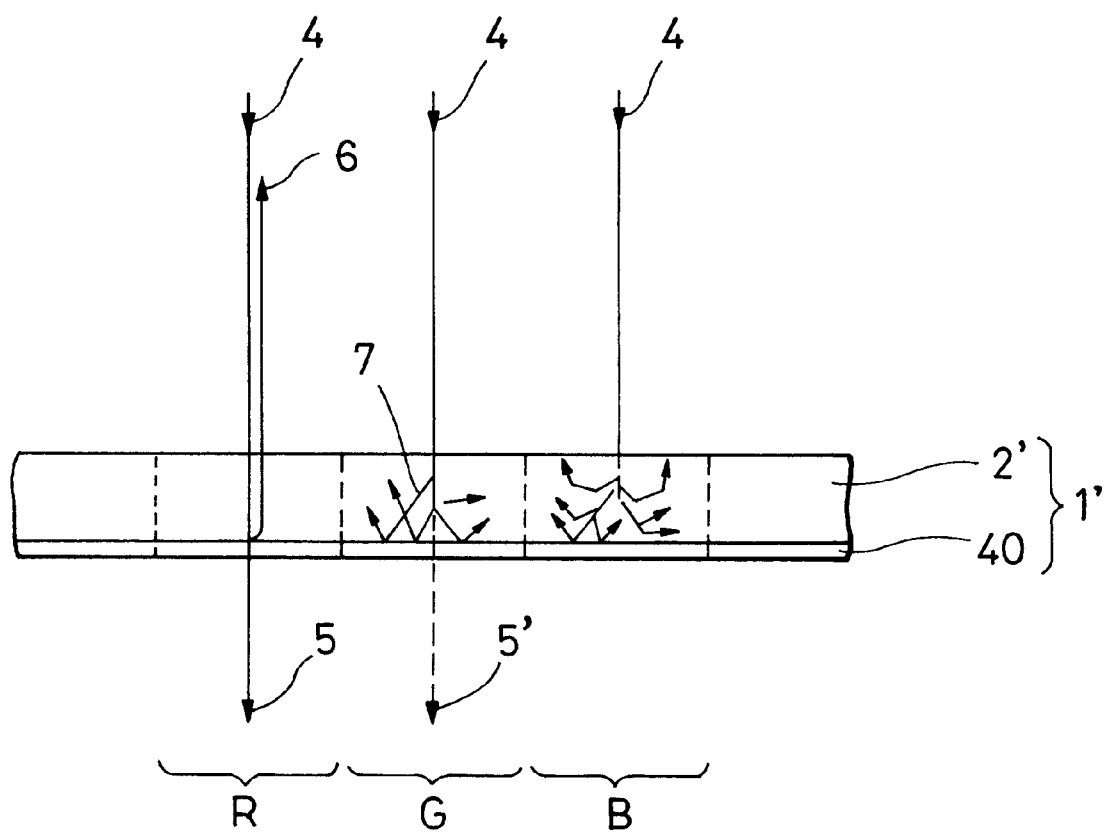
FIG. 6 is a sectional view showing a transmissive type display panel incorporated in embodiment 4.

Referring now to FIG. 6, there is shown a transmissive type display panel 1', a transmissive type PDLC panel 2', and a Fabry-Perot etalon 40 described in embodiment 3. In embodiment 4, the Fabry-Perot etalon is arranged in parallel to the PDLC panel face, and corresponds to each pixel for R, G, or B by changing the depth d. Drawings and explanations for the internal structure of the transmissive type PDLC panel 2' and the electrode structure are omitted.

In the case of the transmissive type PDLC panel 2', the aperture ratio inevitably decreases, the PDLC layer depth should be approximately twice to obtain the same scattering power, the drive voltage and response speed becomes disadvantageous, and the high-resolution images are impaired, compared with a reflective type PDLC panel 2 shown in FIG. 2. On the other hand, the display light having image information can be separated from the illumination light and the light reflected by the optical members in a simple arrangement without cross-talk when the transmissive type is employed.

The pixel for R shown in FIG. 6 is in an unscattering condition under a high voltage applied to PDLC, thus light 4 perpendicularly impinges upon and is transmitted through the transmissive type PDLC panel 2' in every band without influence of scattering, and perpendicularly ($\theta=0°$) enters the etalon 40 for R. Then, the light except that in the band corresponding to R is specular reflected by the etalon, passes through the transmissive type PDLC panel 2' again, and returns as light 6 in the direction of the illumination light 4, while light 5 transmitted through the etalon 40 is completely separated from the illumination light 4 and the reflected light 6, and exits to the opposite side of the panel face.

The pixel for G is in a scattering condition under a low voltage applied to PDLC, thus light 7, which is a portion of the light 4 scattered in the transmissive type PDLC panel 2', is reflected by the etalon 40 for G and is not transmitted through because of the etalon's selectivity for incident angles. Among the light which is not scattered, only that corresponding the band for G is allowed to be transmitted through the etalon 40 for G, and is observed as display light 5'.

Few transmission light beams are observed in such an intense scattering condition of PDLC as shown in the pixel for B.

As described above, employing the transmissive type display panel, the display device of this embodiment achieves the separation of the display light having the image information from the illumination light 4 and the filter reflection light 6 in a simple arrangement without cross-talk.

Embodiment 5

This embodiment concerns a display device according to the present invention having three transmissive type display panels corresponding to R, G, and B, optical systems for multiple continuous projection, and the like. A typical structural view of them is shown in FIG. 7.

Figure 7:
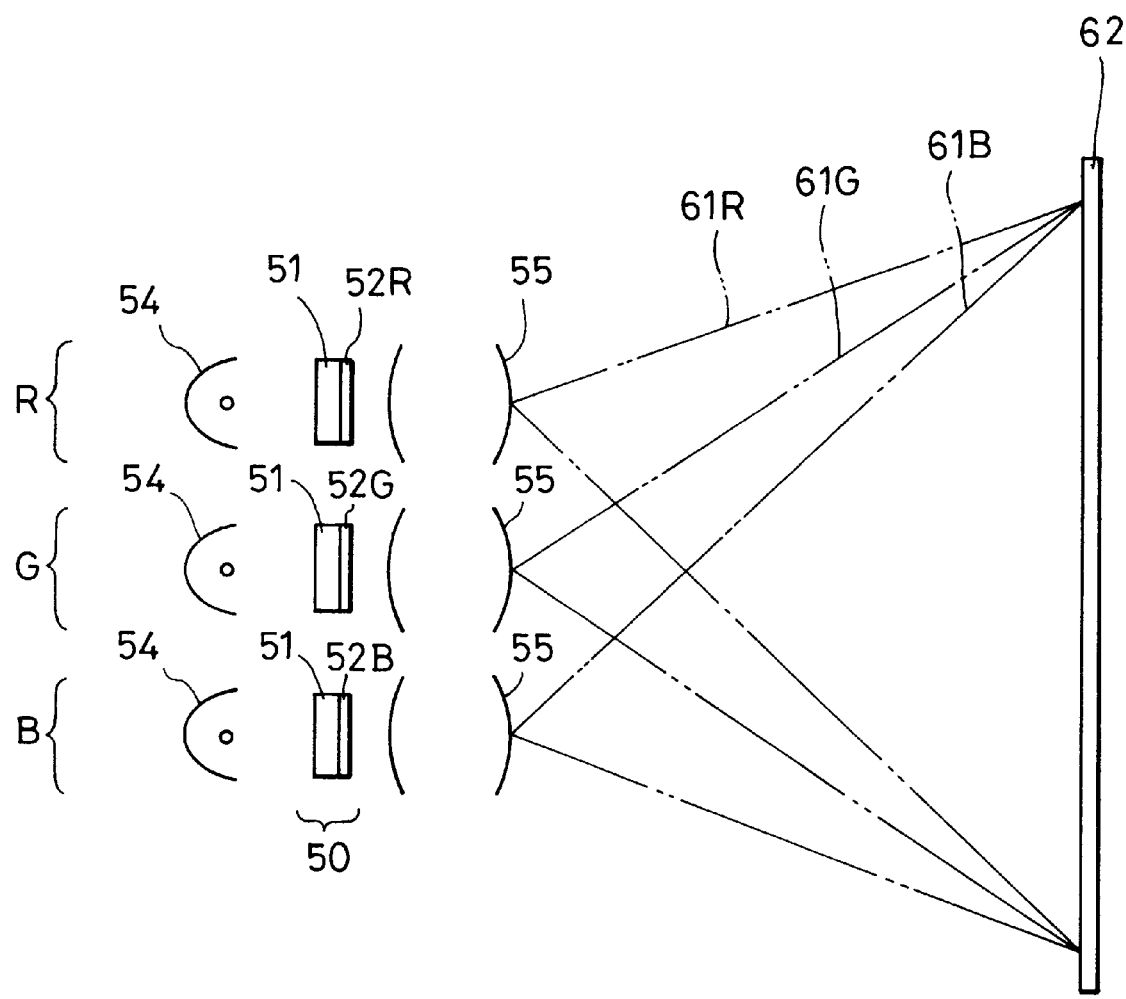
FIG. 7 is a typical view showing a projective display device using the transmissive type display panel incorporated in embodiment 5.

Referring now to FIG. 7, there is shown transmissive type display panels 50, transmissive type PDLC panels 51, etalon filters for R 52R, G 52G, and B 52B, illuminating systems with collective mirrors 54, optical systems for projective image formation 55, projected light beams of R 61R, G 61G, and B 61B, and a screen 62.

According to this embodiment, each of the etalon filters R 52R, G 52G, and B 52B is formed as a sheet of a uniform filter covering the full face of the corresponding PDLC panel 51. However, each of the filters has its own spectroscopic band by changing the depth d corresponding to the panel for R, G, or B. Therefore, it is not necessary to set up the filter characteristic for each of the pixels, as is required in the above embodiment. As a result, production of the display panels 50 becomes quite easier.

The illumination light R, G, and B from the illuminating system 54 is substantially parallel, and each of them enters the corresponding transmissive type PDLC panels 51, and is scattered therein, respectively, according to the required gradation to display. Then, light of unnecessary band and the scattered light is reflected to the illumination light side by the corresponding etalon filter 52R, 52G, or 52B. Consequently, only the required display light is guided to the optical systems for projective image formation 55, and thereby each of the images on the etalon filter 52R, 52G, and 52B is magnified and projected on the magnifying screen 62. Each of the projective light beams 61R, 61G, and 61B, for R, G, and B, respectively, is set up to reach the same point on the screen 62 so as to display a good color image. The arc length of the light source for the illuminating system 54 is so short that it becomes nearly a point light source, thus almost parallel beams can be obtained by a paraboloidal collective mirror, resulting in miniaturization of each optical system. Although the quantity of light is low because of the short arc length, a high efficiency for electric power consumption and a smaller device are achieved as the whole system by arranging independent illuminating systems for R, G, and B.

As we have seen, since each of R, G, and B is provided with an independent panel, a uniform filter corresponding to each band can be used, which fact allows quite easy production of display panels with stable qualities at lower cost. Further, by means of superimposing the magnified real images of R, G, and B by a projective display device with optical systems, a bright and efficient display device with stable qualities is achieved at low cost.

Embodiment 6

This embodiment concerns a display device according to the present invention having three reflective type display panels corresponding to R, G, and B, an optical system for virtual-image formation and the like. A typical structural view of them is shown in FIG. 8.

Figure 8:
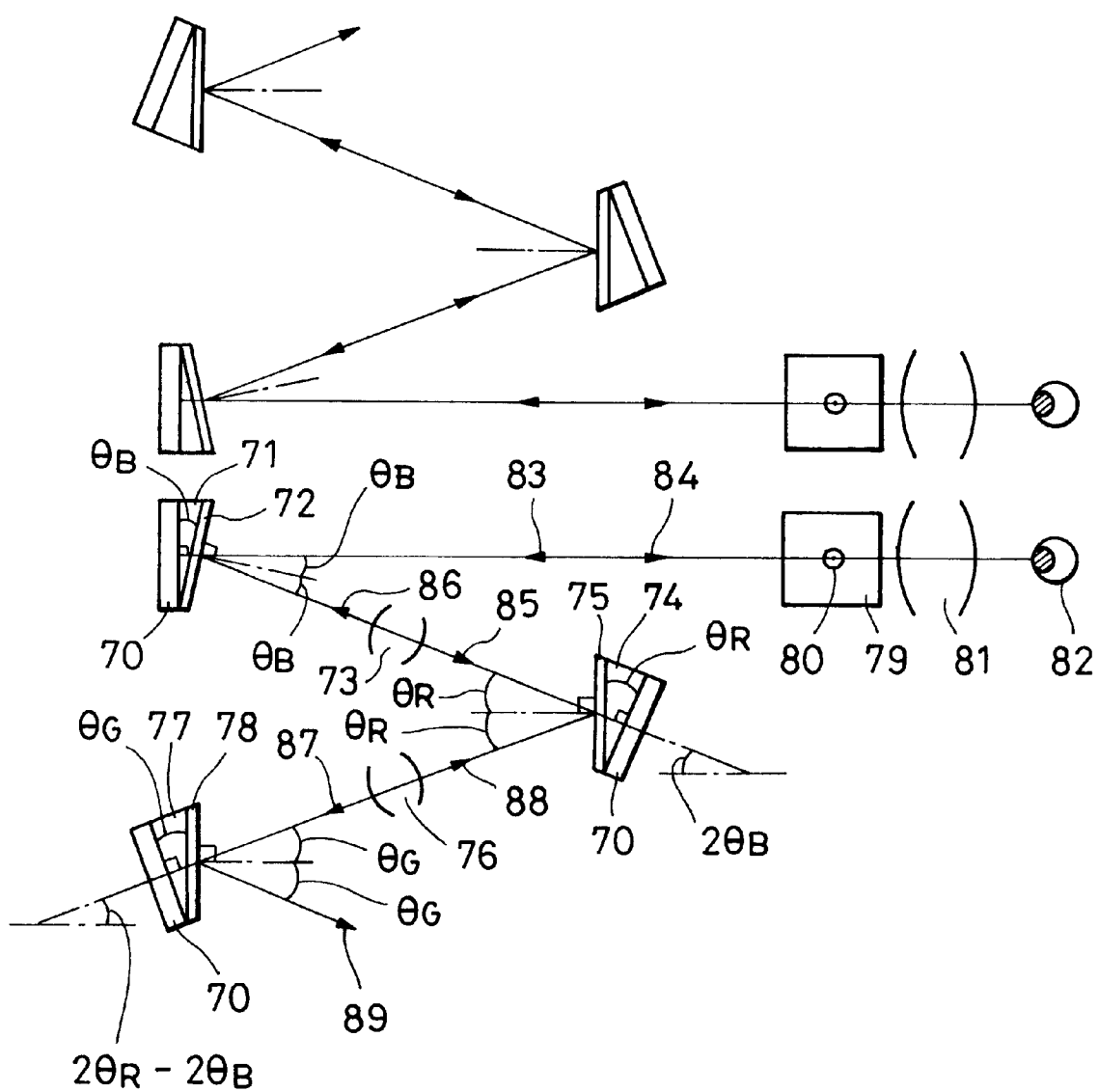
FIG. 8 is a typical structural view showing a virtual-image display device using the reflective type display panel incorporated in embodiment 6.

Referring now to FIG. 8, there is shown reflective type PDLC panels 70, wedge-type substrates 71, 74, 77, etalon filters for R 72, G 75, and B 78, relay optical systems 73, 76, a half mirror 79 for guiding substantially parallel illumination light 80 from a illuminating system (not shown), an optical system for virtual-image formation 81, an viewer's eye 82, and light beams 83 to 89. Although a device for both right and left eyes is illustrated in FIG. 8, explanations are given only to the left eye, as the structural features for the right eye are symmetrical with those of the left eye.

As is illustrated in embodiment 5, the etalon filter is a one sheet of a uniform filter covering the full face of the reflective type PDLC panels 70 according to this embodiment. The etalon filter 72, 75, and 78 corresponding to the panels for R, G, and B, respectively, has its own spectroscopic band by changing depth d. Moreover, each of the reflective type PDLC panels 70 and its corresponding etalon filter 72, 75, or 78 are integrated with the corresponding wedge-type substrate 71, 74, or 77, respectively. In that case, the angles which the panels form with respect to their corresponding filters are set up to be $\theta_B$, $\theta_R$, and $\theta_G$, respectively. As is explained concerning FIG. 2 in embodiment 1, the light beams enter into the filter (the multiple-interference layer 138) at an incident angle θ and are refracted inside of the filter with a refractive angle θ'. Strictly speaking, the refracted beams exit from the filter at an angle which is different from θ, if the filter is asymmetrical. Thus, correction of the incident angle θ is required to allow those beams to perpendicularly impinge the PDLC panels. However, correction for the filter asymmetry and the refractive index of the wedge-type substrates will be neglected in the following description in order to avoid a complicated explanation.

The illumination light 80 from an illuminating system (not shown) is guided by the half mirror 79 as the light beams 83 in the direction of the PDLC panel for B 70, as is shown in FIG. 8. In this case, the illumination light beams 83 have not received any band limitation, yet. After entering into the etalon filter for B 72 at an incident angle $\theta_B$, only the light in the B band is allowed to pass through the filter among the illumination light beams 83, and perpendicularly enter the PDLC panel for B 70 whose normal line is substantially parallel to the illumination light beams 83. Then, the light beams for B images pass through the etalon filter for B 72 in the similar direction to the incident direction and return as the display light beams for B 84 whose optical axis is substantially parallel to the illumination light beams 83.

The illumination light beams 85 form at an angle $2\theta_B$ with respect to the illumination light beams 83, after losing the light in band for B by the reflection in the etalon filter 72 at the reflection angel $\theta_B$. The illumination light beams 85 is transmitted through the relay lens system 73, and enter the etalon filter for R 75 at the incident angel $\theta_R$. As the angle which the normal line of the PDLC panel for R 70 forms with respect to the illumination light beams 83 is set up to be substantially $2\theta_B$, the light in band for R perpendicularly enter the PDLC panel for R 70 after being transmitted through the etalon filter 75. The light beams for R images are re-transmitted through the etalon filter 75 in the same direction as the incident direction and change to the display light beams for R 86 whose optical axis is substantially parallel to that of the illumination light beams 85. After that, the light beams are specular reflected by the etalon filter for R 72 again through the relay lens system, and exit therefrom together with the display light beams for B 84.

After being reflected by the etalon filter 75 at the reflection angel $\theta_R$, the illumination light beams 87 have no beams in the B and R bands, and they form substantially at an angle of $2\theta_R$ with respect to the illumination light beams 85. Through the relay lens system 76, the illumination light beams 87 enter the etalon filter for G 78 at the incident angel $\theta_G$. The angle which the normal line of the PDLC panel for G 70 forms with respect to the illumination light beams 85 is set up to be substantially $2\theta_R$, and the angle which the normal line of the PDLC panel for G 70 forms with respect to the illumination light beams 83 is set up to be $(2\theta_R-2\theta_B)$. The light in the band for G of the illumination light beams 87 perpendicularly enter the PDLC panel for G 70 after being transmitted through the etalon filter 78. The light beams for G images are re-transmitted through the etalon filter for G 78 in the same direction as the incident direction and change to the display light beams for G 88 whose optical axis is substantially parallel to that of the illumination light beams 87. After that, the light beams are specular reflected again by the etalon filter for R 75 through the relay lens system 76, and are specular reflected again by the etalon filter for B 72 through the relay lens system 73, then exit therefrom together with the display light beams for B and R 84. On the other hand, the light beams 89 reflected by the etalon filter 78 at a reflection angle $\theta_G$ are not necessary because they do not have the light in the band for R, G, and B.

Magnified virtual-images of the display light beams of R, G, and B 84 are observed utilizing the virtual-image formation system 81 through the half mirror 79 again. The relay lens systems 73, 76 are prepared for superimposing the display light beams of R and G on those of B.

According to this embodiment, the light utilization efficiency becomes three times higher because light beams which are reflected by the filters and which are not fundamentally utilized can be used as illumination light for other color panels. The efficiency, however, decreases to ½ because a half mirror is required for the reflective type display. By optimizing the incident angle selectivity of the etalon filter 72 to the specification of the optical system as mentioned above, an oblique illuminating system without a half mirror is achieved. In addition, as this system requires only one illumination light source, it is possible to decrease electric power consumption to approximately ⅓ compared with embodiment 5.

As we have seen, since each of R, G, and B is provided with an independent panel, a uniform filter corresponding to each band can be used, which fact allows quite easy production of a display panel with stable qualities at lower cost. Further, by utilizing unnecessary light sequentially for each panel, a bright and efficient display device is achieved with stable qualities at low cost.

According to the liquid crystal display device of the present invention, guiding for unscattered light or shading for scattered light is performed quite efficiently, after the illumination light is scattered or unscattered by the liquid crystal controlled by each pixel. Thus a bright display with a high contrast is provided.

In the case of employing a Fabry-Perot type multi-interference effect, in particular, characteristics of spectroscopic band and angle are easily set up to desirable values, and optical members are allowed to be thinner. Therefore, a small and light-weight display device is achieved.

In addition, particularly when a Fabry-Perot type multiple-interference effect is utilized, optical members are allowed to be integrated and thinner. Thus, a small and light-weight display device with stable qualities is provided.

Moreover, particularly in the case that optical members having a multiple-interference effect and a liquid crystal display panel are integrated, the display panel becomes a small thin single part. Therefore, a decrease in unit cost is achieved because of the stable qualities, lower part cost, and easy fabrication and adjustment.

Application to a wide area of display devices is also possible, such as a work station, personal computer, television, projection television, view finder, head mounted display. A color liquid crystal display devices with bright and high-resolution images are also provided.

What is claimed is:

1. A liquid crystal display apparatus, comprising:
   an illuminating light source which generates illuminating light; and
   a liquid crystal panel comprising an optical member which causes a multiple-interference effect, a transparent electrode, a liquid crystal layer for switching between a dark state and a light state corresponding to an applied voltage, and a reflective electrode along the optical path of said illuminating light in turn from said light source,
   wherein a surface of said optical member is inclined relative to a surface of said reflective electrode wherein the optical member is located on a light incident side of the liquid crystal panel causing the illuminating light to have a multiple-interference effect before being transmitted through said liquid crystal layer.

2. A liquid crystal display apparatus as set forth in claim 1, wherein said multiple-interference effect is a Fabry-Perot interference effect.

3. A liquid crystal display apparatus as set forth in claim 2, wherein said optical member is a Fabry-Perot etalon.

4. A liquid crystal display apparatus as set forth in claim 2, wherein said optical member is integrated with said liquid crystal panel.

5. A liquid crystal display apparatus as set forth in one of claims 1, 2, 3, or 4, wherein said optical member is allowed to transmit only light whose wavelength is included in a band for three primary colors R, G and B for color display.

6. A liquid crystal display apparatus as set forth in one of claims 1, 2, 3, or 4, wherein said optical member is composed of segmental portions corresponding to a pixel arrangement of said liquid crystal panel, which portions are allowed to transmit only light whose wavelength is included in a band for one of three primary colors R, G, and B which is displayed by the corresponding pixel.

7. A liquid crystal display apparatus as set forth in claim 6, wherein said segmental portions of said optical member are arranged in a stripe or mosaic pattern.

8. A liquid crystal display apparatus as set forth in claim 7, wherein said liquid crystal panel is a transmissive type panel and said optical member is positioned substantially parallel to the emitting surface of said transmissive type panel.

9. A liquid crystal display apparatus as set forth in claim 8, comprising a plurality of said transmissive type panel and a plurality of said optical member, a plurality of illuminating systems corresponding to said transmissive type panel, and a plurality of optical projectors corresponding to said transmissive type panel, wherein said optical member is disposed between said transmissive type panels and said optical projectors.

10. A liquid crystal display apparatus as set forth in claim 7, wherein said liquid crystal panel is a reflective type panel and said optical member is positioned inclined at a predetermined angle with respect to the surface of said reflective type panel.

11. A liquid crystal display apparatus as set forth in claim 10, comprising an illuminating system, a plurality of said reflective type panel, a plurality of said optical member, and a plurality of optical projectors, said optical member being arranged at the reflective side of said reflective type panel, wherein said reflective type panel is positioned and arranged to form successive stages, such that light from said optical member is irradiated in a direction perpendicular to said reflective type panel of the next stage.

12. A liquid crystal display apparatus as set forth in claim 1, wherein said liquid crystal layer is a polymer dispersed liquid crystal layer.

13. A liquid crystal display apparatus as set forth in claim 12, wherein said polymer dispersed liquid crystal layer can switch between a scattered condition for a dark state and an unscattered state for a light state.

* * * * *

UNITED STATES PATENT AND TRADEMARK OFFICE
CERTIFICATE OF CORRECTION

PATENT NO.    : 6,144,427
DATED         : November 7, 2000
INVENTOR(S)   : Hiroaki Hoshi et al.

It is certified that error appears in the above-identified patent and that said Letters Patent is hereby corrected as shown below:

Title page,
Item [57] ABSTRACT,
Line 2, "in" should be deleted.

Column 1,
Line 59, "an" should read -- a --; and
Line 60, "above" should read -- the above --

Column 2,
Line 55, "word," should read -- words, --;
Line 56, "has" should read -- has a --; and
Line 57, "and the" should read -- which --.

Column 3,
Line 27, "FIG. 1" should read -- FIGS. 1 --.

Column 5,
Line 23, "$\varepsilon=4/\sqrt{\sqrt{f}}$" should read -- $\varepsilon=4/\sqrt{f}$ --;

Line 24, "formula" should read -- formulae --;
Line 26, "$F=n\sqrt{\sqrt{f}}/2$" should read -- $F=n\sqrt{f}/2$ --;

Line 42, "enough large," should read -- large enough, --; and
Line 58, "efficiency ." should read -- efficiency. --.

Column 6,
Line 24, "a" should read -- an --;
Line 40, "layer." should read -- layers .-- ; and
Line 44, "two dimensional" should read -- a two-dimensional --.

Column 7,
Line 2, "length" should read -- lengths --; an
Line 33, "formula" should read -- formulae --.

UNITED STATES PATENT AND TRADEMARK OFFICE
CERTIFICATE OF CORRECTION

PATENT NO.   : 6,144,427
DATED        : November 7, 2000
INVENTOR(S)  : Hiroaki Hoshi et al.

It is certified that error appears in the above-identified patent and that said Letters Patent is hereby corrected as shown below:

<u>Column 9,</u>
Line 7, "corresponding" should read -- corresponding to --.

<u>Column 10,</u>
Line 13, "a" should read -- an --;
Line 14, "an" should read -- a --;
Line 19, "a" should be deleted;
Line 22, "filter" should read -- filters --; and
Line 23, "has its" should read -- have their --.

<u>Column 11,</u>
Line 26, "specular" should read -- specularly --; and
Line 28, "specular" should read -- specularly --.

<u>Column 13,</u>
Line 2, "panels" should read -- panel --.

Signed and Sealed this

Twelfth Day of February, 2002

*Attest:*

JAMES E. ROGAN
*Attesting Officer*   *Director of the United States Patent and Trademark Office*